June 20, 1944.　　　　E. W. WITT　　　　2,352,055
APPARATUS FOR MAKING THE CARCASS OF A RUBBER TIRE
Filed Aug. 22, 1940　　　　4 Sheets-Sheet 1

INVENTOR
Earney William Witt
By [signature]
his ATTY.

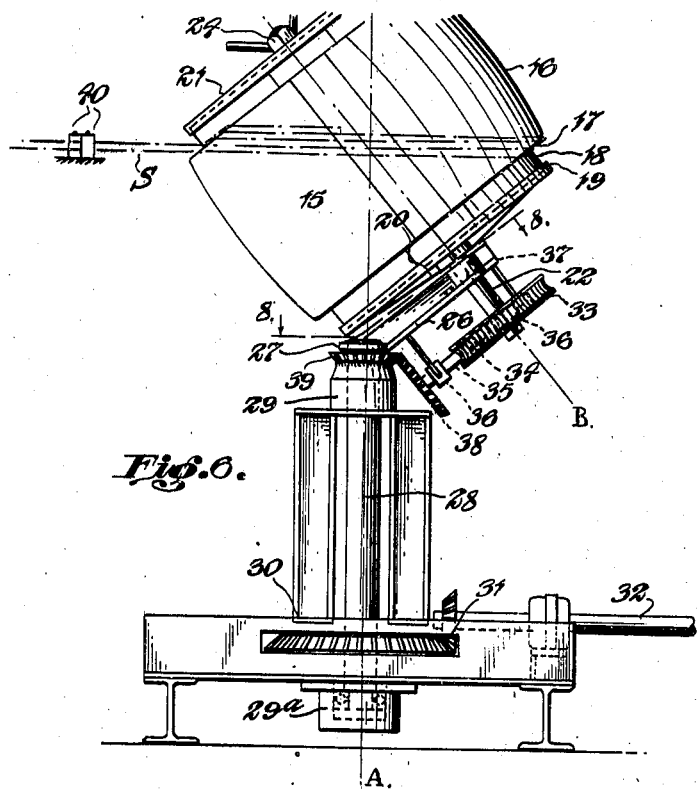
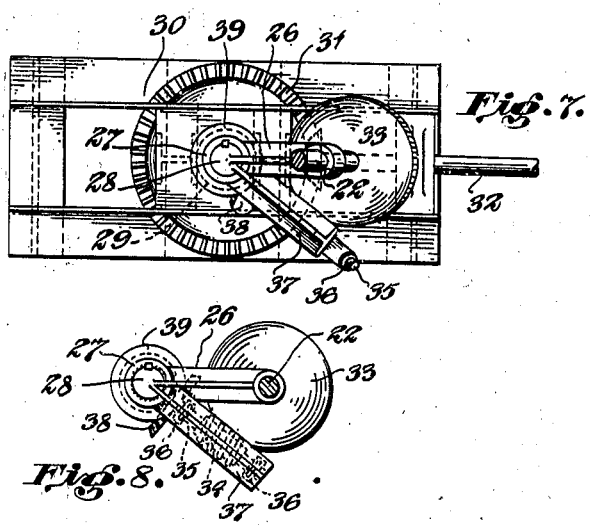

June 20, 1944.   E. W. WITT   2,352,055
APPARATUS FOR MAKING THE CARCASS OF A RUBBER TIRE
Filed Aug. 22, 1940   4 Sheets-Sheet 3

INVENTOR
Earney William Witt
By [signature]
his Atty.

June 20, 1944.  E. W. WITT  2,352,055
APPARATUS FOR MAKING THE CARCASS OF A RUBBER TIRE
Filed Aug. 22, 1940  4 Sheets-Sheet 4

INVENTOR
Earney William Witt
By
his ATTY.

Patented June 20, 1944

2,352,055

UNITED STATES PATENT OFFICE 2,352,055

APPARATUS FOR MAKING THE CARCASSES OF RUBBER TIRES

Earney William Witt, Windsor, Victoria, Australia

Application August 22, 1940, Serial No. 353,690
In Australia August 31, 1939

3 Claims. (Cl. 154—10)

This invention relates to an apparatus for making the carcass of a rubber tire.

The primary object of this invention is to provide means for making the carcass of a rubber tire by winding suitable strip material such as a ribbon of rubber coated cord (all hereinafter called strip material) on a removable former, the said carcass being formed so that when it is removed from the former it may be arranged on a suitable core (such as an inflatable core) and be built up to form a cover which is then cured in known manner.

Any suitable strip material may be used but the preferred material comprises spaced apart cords arranged between ribbons of soft raw rubber so that each cord is encased in the rubber, as described in my co-pending patent application Ser. No. 353,689 filed August 22, 1940.

In order that this invention may be more readily understood practical embodiments thereof will be described with reference to the accompanying drawings in which:

Fig. 6 is a side view of the preferred means to support and travel a former to wind strip material thereon as shown in Figs. 1, 2 and 4 with part of the driving gear to rotate the former and the support for the said part of the driving gear shown in broken lines;

Fig. 7 is a plan of the arrangement shown in Fig. 6 but with the former and part of the axial support for the former removed;

Fig. 8 is a sectional plan on line 8—8 of Fig. 6;

Figure 11:
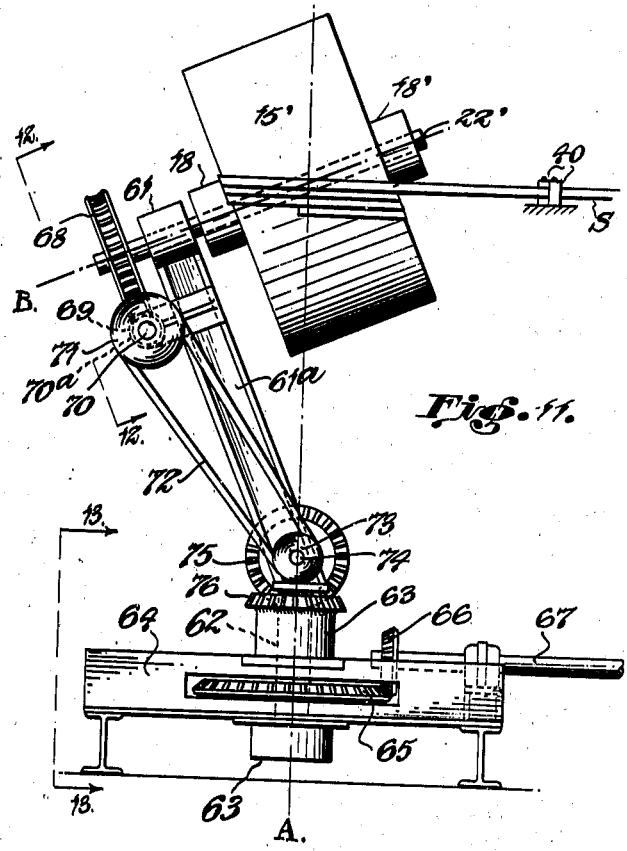
Fig. 11 is a side view of a further modified means to wind strip material on a former.

The former comprises an annular drum shaped body 15 having a circumferential face 16 and ends 17. The said face 16 may be curved as shown in Figs. 1 to 6 and Fig. 9 or it may be flat as shown in Fig. 11. A circular flange 18 projects axially from each end 17 of the said body. The former shown in Figs. 2 to 6 is formed of sections the ends of which are supported by inwardly projecting rims 19 on the respective end discs 20 and 21. Member 20 is fixed on an axial shaft 22 by a set screw 23 and the other end member 21 is held in position by a wing nut 24 which engages a screw thread 25 on the end of shaft 22.

In the arrangement shown in Figs. 6 to 8, the shaft 22 is rotatably supported in a bearing carried by an arm 26 which projects angularly from a collar 27 that is fixed on the upper end of a vertical shaft 28 which is rotatable in bearings 29 and 29a mounted on fixed framing 30. Shaft 28 is driven through bevel gears 31 by a driving shaft 32. A helical gear 33 on shaft 22 meshes with a complementary gear 34 on a shaft 35 that is supported in bearings 36 carried by an arm 37 which also extends from collar 27. A gear wheel 38 on shaft 35 meshes with a complementary gear 39 that is fixed on bearing 29.

When shaft 28 is rotated, arm 26 is revolved around the axis A of shaft 28 (herein also called the main axis) and carries the former around the said axis to draw strip material S through guides 40 and wind the said material on the exterior of the former. Each winding of strip material extends obliquely across the face 16 of the body of the former as at a, across one end of the former in proximity to a flange 18 as at b, then obliquely across the opposite side of the face 16 of the former as at c and then across the other end of the former in proximity to the other flange 18 as at d. At the same time the gears 33, 34, 38 and 39 revolve the shaft 22 about axis B at such speed that successive windings of strip material are laid on the former so that they overlap or are side by side or are suitably spaced apart. In the drawings the windings are shown side by side but it will be understood readily that the relative position of successive windings may be regulated by varying the ratios of the gears 33 and 34 or the gears 38 and 39.

Figure 1:
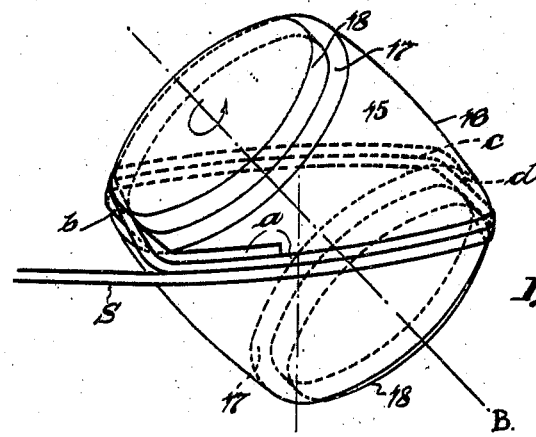
Fig. 1 is a diagrammatic perspective view of a former with two windings of strip material arranged thereon.
Figure 2:
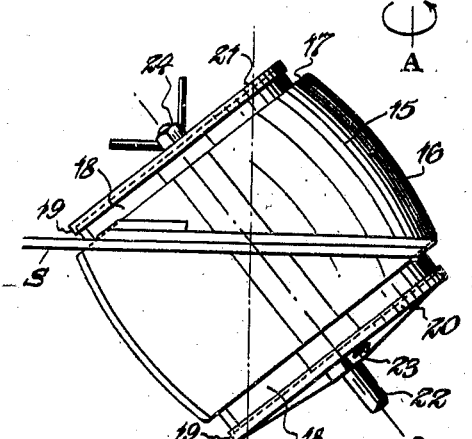
Fig. 2 is a side view of a collapsible former with two windings of strip material arranged thereon.
Figure 3:
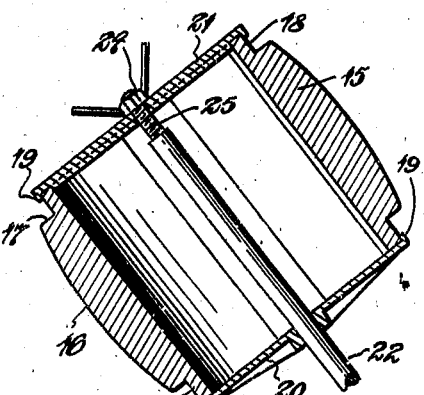
Fig. 3 is a central vertical section of the former shown in Fig. 2 but omitting the windings of strip material.
Figure 4:
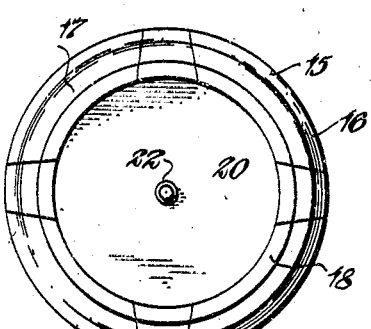
Fig. 4 is an end view of the former shown in Fig. 3 but with the nearer end plate removed.
Figure 5:
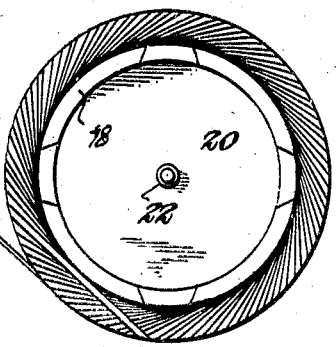
Fig. 5 is a diagrammatic view of the former shown in Fig. 4 with strip material wound thereon.
Figure 9:
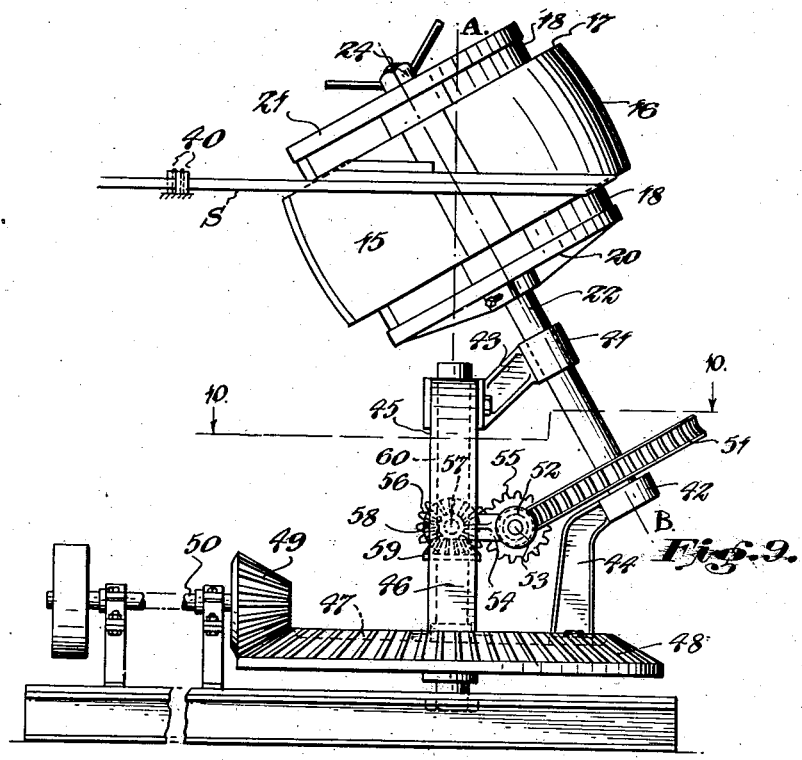
Fig. 9 is a side view of modified means to wind strip material on a former.
Figure 10:
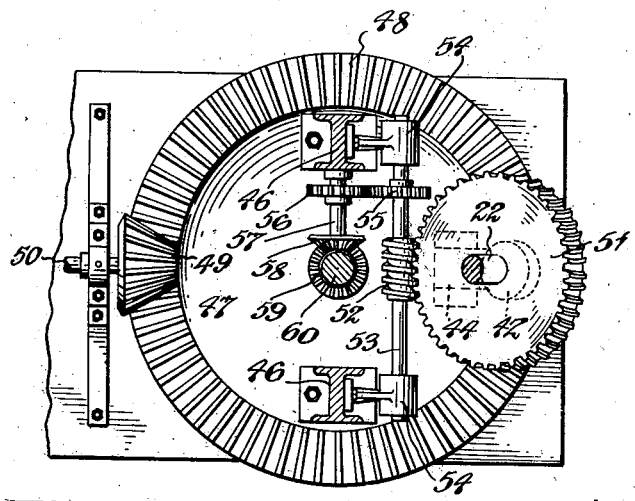
Fig. 10 is a plan on line 10—10 of Fig. 9.

In the arrangement shown in Figs. 9 and 10, the shaft 22 is supported on bearings 41 and 42 on brackets 43 and 44 respectively. Bracket 43 extends from the upper part of an arch shaped member 45 the uprights 46 of which are fixed on the web 47 of a bevel gear 48 and bracket 44 is also fixed on the said web 47. Bevel gear 48 meshes with a gear pinion 49 on a drive shaft 50. A helical gear 51 on shaft 22 meshes with a complementary gear 52 on a shaft 53 which is supported in bearings 54 on the respective uprights 46. A spur gear 55 on shaft 53 meshes with a complementary gear 56 on a shaft 57 on which is a bevel gear 58 which meshes with another bevel gear 59 fixed on a support 60 arranged axially of the bevel gear 48 and the main axis A.

When the bevel gear 48 is rotated the former travels around the main axis A and strip material is laid on the former in the manner previously described. At the same time the shaft 22 is rotated around axis B by gears 51, 52, 55, 56, 58 and 59 to revolve the former to lay successive windings in the desired relative position.

Figures 12, 13:
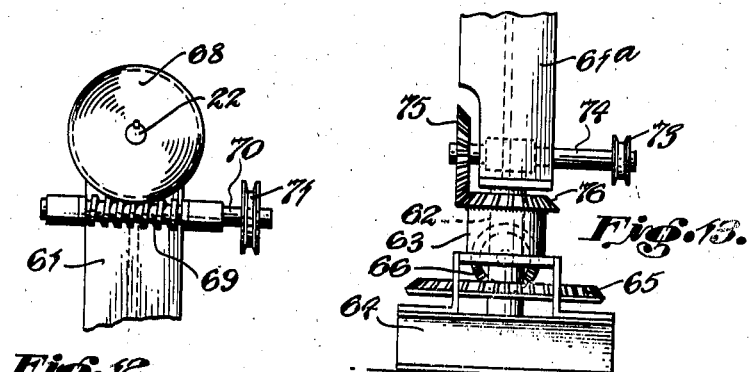
Fig. 12 is an end view of some of the parts shown in Fig. 11 viewed on line 12—12.
Fig. 13 is an end view of some of the parts shown in Fig. 11 viewed on line 13—13.

In the arrangement shown in Figs. 11 to 13, the shaft 22' of the former 15' showing flanges 18' is carried in a bearing 61 at the upper end of an arm 61a the lower end of which is fixed on the upper end of a shaft 62 that is supported in bearing 63 carried by fixed framing 64. A bevel gear 65 on shaft 62 meshes with a bevel pinion 66 on a driving shaft 67. A helical gear 68 on shaft 22 meshes with a complementary gear 69 on a shaft 70 which is supported in bearings 70a carried by arm 61a. A pulley 71 on shaft 70 is connected by a belt 72 to a pulley 73 on a shaft 74 which is supported in a bearing attached to the lower part of arm 61. A bevel gear 75 on shaft 74 meshes with a bevel gear 76 which is fixed on bearing 63.

When the bevel gear 65 is rotated the former travels around the main axis A and strip material is laid on the former in the manner previously described. At the same time the shaft 22 is rotated around axis B by gears 68 and 69, pulleys 71, and 73 and belt 72, and gears 75 and 76 to cause successive windings to be laid on the former in desired relative position.

What I claim is:

1. Apparatus for making the carcass of a rubber tire comprising a rotatable member, a drum-shaped former, a fixed guide for rubber strip material to be wound on said former, means rotatably supporting said former on said rotatable member in an angularly inclined position with the axes of said former and of said rotatable member intersecting each other at the centre of the former, means to rotate said rotatable member about its axis, a fixed gear coaxial with said rotatable member, and means actuated by said fixed gear and including a speed reducing gear to rotate said former about its axis at a speed to offset successive rubber strip windings on said former by an amount equal to the width of the rubber strip.

2. Apparatus for making the carcass of a rubber tire comprising a former having a drum shaped body and a circular flange projecting axially from each end of the said body, a shaft arranged axially of and secured to the said former, a rotatable gear the axis of which is set angularly relatively to the axis of the said shaft so that the axis of the said rotatable gear and the axis of the said shaft intersect each other at the centre of the former, means to support said shaft on said rotatable gear, a fixed gear arranged coaxially with said rotatable gear, and gears connecting the said shaft to said fixed gear so that the former is slowly rotated around its own axis as it is rotated around the axis of the said rotatable gear.

3. Apparatus for making the carcass of a rubber tire comprising a former having a drum shaped body and a circular flange projecting axially from each end of the said body, a shaft arranged axially of and secured to the said former, a rotatable gear the axis of which is set angularly relatively to the axis of the said shaft so that the axis of the said rotatable gear and the axis of the said shaft intersect each other at the centre of the former, a shaft to which the said rotatable gear is fixed, means to support the shaft of the former, said means being attached to the shaft of the rotatable gear and disposed angularly relatively thereto, a gear fixed concentrically relatively to the shaft of the said rotatable gear, and gear means to connect the shaft of the former to the said fixed gear so that the former is slowly rotated about its own axis as it is rotated relatively to the axis of the said rotatable gear.

EARNEY WILLIAM WITT.